March 18, 1958     J. A. McCLINTOCK     2,826,950

CHUCK WRENCH

Filed April 5, 1957

INVENTOR.
JOHN A. McCLINTOCK

BY
*Oberlin & Limbach*
ATTORNEYS

United States Patent Office 2,826,950
Patented Mar. 18, 1958

2,826,950

CHUCK WRENCH

John A. McClintock, Cleveland, Ohio

Application April 5, 1957, Serial No. 651,051

4 Claims. (Cl. 81—90)

The present invention, while indicated as relating specifically to a chuck wrench, relates more generally to a wrench which is adapted to turn a peripherally recessed cylindrical body, whether that body be a part of a drill chuck (frequently referred to as a Jacobs chuck), a threading die holder, a shank of a tap or reamer holder, etc.

In the hand tapping of a drilled hole it is common practice to employ a drill press for drilling the hole in the work and then using a hand-actuated tap wrench for threading such hole. As an aid to hand tapping there are available special fixtures that provide guide bearings for the tap holders but these fixtures are relatively expensive and do not insure any high degree of accuracy since the work is moved from the drill press to the fixture. In the present case it is contemplated to use the drill chuck of the drill press spindle not only for drilling a hole in the work but also for turning a tap held therein for thus achieving accuracy by reason of the use of the same chuck and spindle for drilling and threading without shifting the work.

Drill chucks of the character referred to above are well-known in the art and may comprise a cylindrical body formed with converging openings in which the jaws are longitudinally movable to grip the shank of a tool therebetween and a rotary sleeve around said body which, when rotated in opposite directions, effects longitudinal movement of the jaws along such converging passages whereby said jaws move radially outward or inward relative to one another. In such drill chuck, said body is usually formed with radial openings, usually three in number, in any one of which the pilot of a key is rotatably supported with its teeth in mesh with teeth formed around the end of said rotary sleeve. Thus, when the key pilot is inserted in one of the pilot holes of the chuck body, the rotation of the key effects rotation of the sleeve and consequent actuation of the chuck jaws.

It is one principal object of this invention to provide a wrench for a chuck of the above-described type which is characterized by the provision of a spring detent which is adapted to spring into one of the key pilot holes of the chuck to hold the wrench in place and which is further characterized by the provision of means for positively locking the detent in the keyhole so that said detent constitutes, in effect a driving key by which torque may be transmitted from the wrench handle to the chuck.

It is another object of this invention to provide a wrench which, when clamped on the peripherally recessed body, or specifically, on the recessed cylindrical body of a drill chuck, has three-point gripping engagement with said body to provide a sturdy connection between the wrench and said body for transmission of torque of substantial magnitude.

It is another object of this invention to provide a wrench which may be easily and quickly initially slipped over the peripherally recessed cylindrical body and then easily and quickly positively locked to the body for transmission of torque from the wrench handle to the body.

It is yet another object of this invention to provide a wrench having a simple and inexpensive insert when the wrench proper is made as of die-cast metal.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
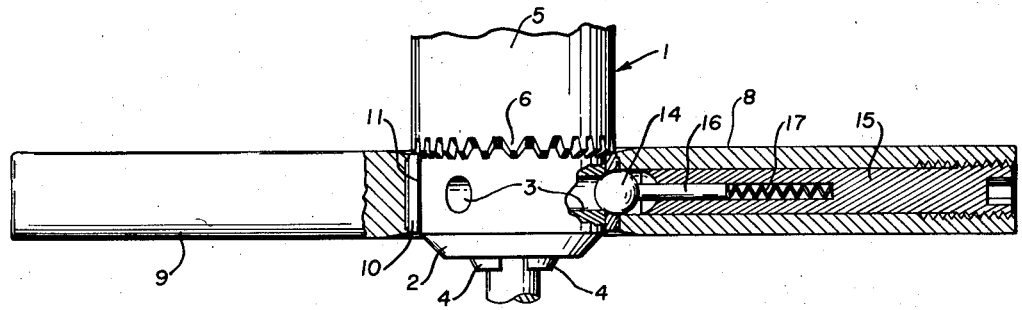
Fig. 1 is a cross-section view of the wrench constituting the present invention showing the same as initially slipped over the peripherally recessed cylindrical body of a conventional drill chuck.

Referring now more particularly to the drawing, the drill chuck 1 has a cylindrical body 2 formed with radially extending key pilot holes 3 and with downwardly converging passages or slots (not shown) in which the jaws 4, usually three in number, are longitudinally movable. Said jaws 4, when moved downwardly with respect to the body 2, move together and conversely, when said jaws are moved upwardly, they move apart. Such movement of the jaws 4 is effected by means of the rotary sleeve 5 provided with teeth 6 which mesh with teeth formed on the chuck key (not shown), said key having a pilot rotatably fitted into any one of the key pilot holes 3. Thus, when such key is rotated, the sleeve 5 is rotated to move the jaws either upwardly or downwardly to release or to grip the tool therebetween, for example a tap T.

The wrench herein is shown as comprising a center ring portion 7 with diametrically opposite radially extending handles 8 and 9 and when said ring portion 7 and handles 8 and 9 are made of die-casting or like alloy an insert 10 of steel or like metal may be provided, said insert being formed with a serrated or knurled exterior surface to lock the insert in said ring portion 7. For sake of economy of manufacture, said insert 10 is fabricated from strip metal knurled or serrated on one side and formed with thinned portions adjacent the abutting ends that provide clearance 11 with the cylindrical body 2.

Figure 3:
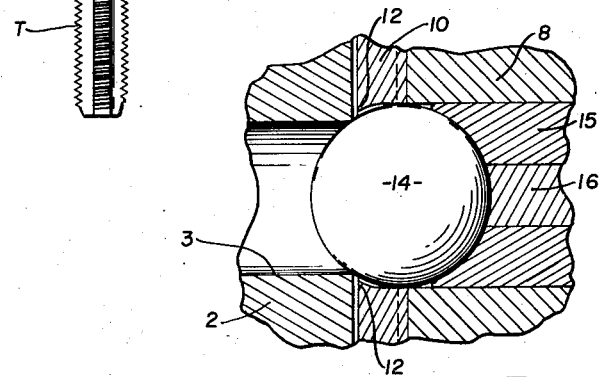
Fig. 3 is a fragmentary cross-section view showing, on enlarged scale, the positive locking of the detent in a peripheral recess of the chuck body.
Figure 2:
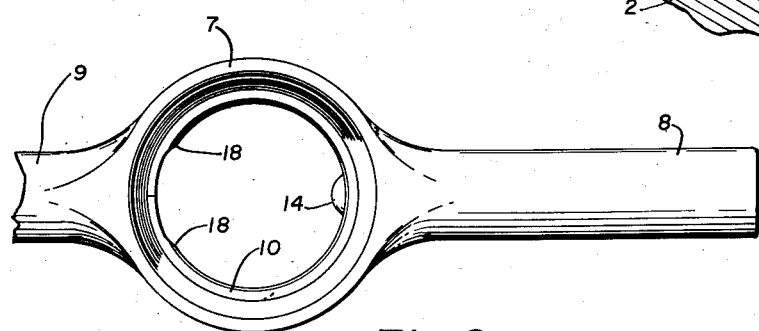
Fig. 2 is a bottom plan view of the wrench shown in Fig. 1.

One of the handles, i. e. handle 8 is formed with a longitudinally extending bore threaded adjacent its outer end. Said bore extends only part way through the insert 10 so as to leave detent-retaining lips 12 (see Fig. 3). Longitudinally movable in such bore is a detent 14 herein shown as comprising a ball. Screwed into said handle 8 is a rod 15 which slidably carries a detent plunger 16 that presses detent 14 radially inward under the influence of the spring 17.

When the aforesaid parts of the wrench are in the position shown in Fig. 1, the wrench may easily be slipped over the chuck body 2 and rotated until the detent 14 springs into one of the key pilot holes 3, to yieldably hold the wrench in place.

After the wrench has been thus initially slipped over the chuck body 2, the rod 15 is screwed inward until its concave end surface abuts the detent 14 to positively hold the latter in engagement with the key pilot hole 3. In such clamped position of the wrench on the chuck body 2, it is to be noted that the detent-retaining lips 12 are clear of the detent 14 so as not to interfere with solid metal-to-metal engagement of the detent 14 within the key pilot hole 3. By so tightening the rod 15, the wrench is firmly clamped on the chuck body 2 by pressure applied at three points, that is, at the detent 14 and at the points 18 adjacent the thin portions of the insert 10.

Now, the drill chuck 1 is ready to be positively rotated by torque applied on the handles 8 and 9, the detent 14 constituting a drive key. To remove the wrench from the drill chuck 1, all that it is necessary to do is to unscrew the rod 15, preferably until its outer end is approximately flush with the outer end of the handle 8, whereupon the wrench may be slipped off the chuck body 2.

Figure 4:
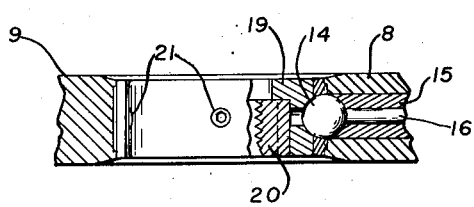
Fig. 4 is a fragmentary cross-section view of the wrench as assembled on a threading die holder, the holder being a cylindrical body formed with a peripheral recess engaged by the detent of the wrench.

Fig. 4 shows the present wrench as used to nonrotatably clamp the holder 19 for a threading die 20. Said holder 19 is provided with a plurality of setscrews 21 by which the die 20 is held in place and also is provided with a peripheral recess in which the detent 14 is adapted, as aforesaid, to be first spring-engaged and then positively engaged to constitute a driving key.

Obviously, the wrench herein may be positioned around and locked on peripherally recessed cylindrical bodies other than the chuck body 2 or the die holder 19 herein shown.

It is to be understood that when the wrench is made of steel or like strong metal, the insert 10 is not required. Similarly, the wrench may be provided with but a single handle 8 if so desired, but it has been found preferably to provide a pair of diametrically opposite handles 8 and 9 for convenience and for application of greater forces. Furthermore, it is contemplated to use a detent plunger with a rounded inner end instead of a ball 14, in which case, the detent 14 and detent plunger 16 may be integrally formed.

Other modes of applying the principle of the invention may be employed, change being made as regards the details described, provided the features stated in any of the following claims, or the equivalent of such, be employed.

I therefore particularly point out and distinctly claim as my invention:

1. A wrench for turning a peripherally recessed cylindrical body about its central longitudinal axis, said wrench comprising a head and a radially extending handle, said head being formed with an opening to receive such body therein, a spring-pressed detent extending radially from said handle into said opening and adapted to spring into a recess of such body when aligned therewith, and positive abutment means in said handle movable radially into engagement with said detent to lock the latter against radial outward movement whereby said detent constitutes a key to positively transmit torque from said wrench to such body.

2. The wrench of claim 1 wherein said opening, diametrically opposite said detent, is radially enlarged so as to radially clear such body to thus provide with said detent a three-point gripping of such body by said wrench.

3. A wrench for turning a peripherally recessed cylindrical body about its central longitudinal axis, said wrench comprising a head and a radially extending handle, said head being formed with an opening to receive such body therein, a spring-pressed ball detent extending radially from said handle into said opening and adapted to spring into a recess of such body when aligned therewith, and screw abutment means in said handle and including a screw-actuated rod whose inner end is movable radially into abutting engagement with said ball detent to lock the latter against radial outward movement whereby said ball detent constitutes a key to positively transmit torque from said wrench to such body.

4. The wrench of claim 2 wherein said opening is defined by a split insert of strip metal whose juxtaposed ends are thinned to provide the aforesaid clearance with said body.

References Cited in the file of this patent
UNITED STATES PATENTS 2,106,319   Federighi _____ Jan. 25, 1938
2,729,128   Gilbert _____ Jan. 3, 1956